United States Patent
Arroyo et al.

(10) Patent No.: US 9,697,155 B2
(45) Date of Patent: *Jul. 4, 2017

(54) DETECTING AND CONFIGURING OF EXTERNAL IO ENCLOSURE

(71) Applicant: International Business Machines Corporation, Armonk, NY (US)

(72) Inventors: Jesse P. Arroyo, Rochester, MN (US); Ellen M. Bauman, Rochester, MN (US); Curtis S. Eide, Rochester, MN (US); Christopher J. Engel, Rochester, MN (US); Gregory M. Nordstrom, Pine Island, MN (US); Harald Pross, Wildberg (DE); Thomas R. Sand, Rochester, MN (US); William A. Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/549,912

(22) Filed: Nov. 21, 2014

(65) Prior Publication Data

US 2016/0147697 A1    May 26, 2016

(51) Int. Cl.
| | |
|---|---|
| *G06F 13/362* | (2006.01) |
| *G06F 13/40* | (2006.01) |
| *G06F 13/42* | (2006.01) |
| *G06F 9/445* | (2006.01) |
| *G06F 9/44* | (2006.01) |

(52) U.S. Cl.
CPC .......... *G06F 13/362* (2013.01); *G06F 9/4411* (2013.01); *G06F 9/44505* (2013.01); *G06F 13/4027* (2013.01); *G06F 13/4068* (2013.01); *G06F 13/4282* (2013.01)

(58) Field of Classification Search
CPC ......... G06F 11/0793; G06F 2213/0026; G06F 13/4022; G06F 13/385
See application file for complete search history.

(56) References Cited

U.S. PATENT DOCUMENTS

| | | |
|---|---|---|
| 7,506,087 B2 | 3/2009 | Ho et al. |
| 7,814,254 B2 | 10/2010 | Abumi |
| 8,103,993 B2 | 1/2012 | Atherton et al. |
| 8,443,126 B2 | 5/2013 | Elboim |
| 8,661,178 B2 | 2/2014 | Richard |
| 8,745,292 B2 | 6/2014 | Lais et al. |

(Continued)

OTHER PUBLICATIONS

Appendix P—List of IBM Patents or Patent Applications Treated As Related—Sep. 27, 2015.

(Continued)

*Primary Examiner* — Jigar Patel
(74) *Attorney, Agent, or Firm* — Joan Pennington

(57) ABSTRACT

A method, system and computer program product are provided for detecting and configuring an external input/output (IO) enclosure in a computer system. A PCIE Host Bridge (PHB) in a system unit is connected to a plurality of PCIE add-in card slots. One or more cables are connected between the PHB and the external enclosure. System firmware including detecting and configuring functions uses sideband structure for detecting a PCIE cable card and configuring the external input/output (IO) enclosure.

9 Claims, 13 Drawing Sheets

(56) References Cited

U.S. PATENT DOCUMENTS

| | | | |
|---|---|---|---|
| 2007/0159489 A1* | 7/2007 | Knepper | G06F 11/221 345/520 |
| 2008/0005377 A1* | 1/2008 | Lambert | G06F 1/266 710/15 |
| 2012/0036306 A1* | 2/2012 | Miyoshi | G06F 13/102 710/316 |
| 2012/0079139 A1* | 3/2012 | Sonokawa | H04L 41/12 710/16 |
| 2012/0258611 A1* | 10/2012 | Bingi | G06F 13/409 439/55 |
| 2014/0281668 A1 | 9/2014 | He et al. | |
| 2014/0351654 A1* | 11/2014 | Zhang | G06F 11/2221 714/43 |

OTHER PUBLICATIONS

"External I/O Expansion Unit for SPARC Enterprise, M4000/M5000/M8000/M9000 Servers," Installation and Service Manual, Fujitsu Limited, 2011.

Engel et al., "PHYP MEX Programming Guide," Version 2.2, May 19, 2014.

Appendix P—List of IBM Patents or Patent Applications Treated As Related—Jan. 11, 2015.

Appendix P—List of IBM Patents or Patent Applications Treated As Related -Apr. 30, 2016.

* cited by examiner

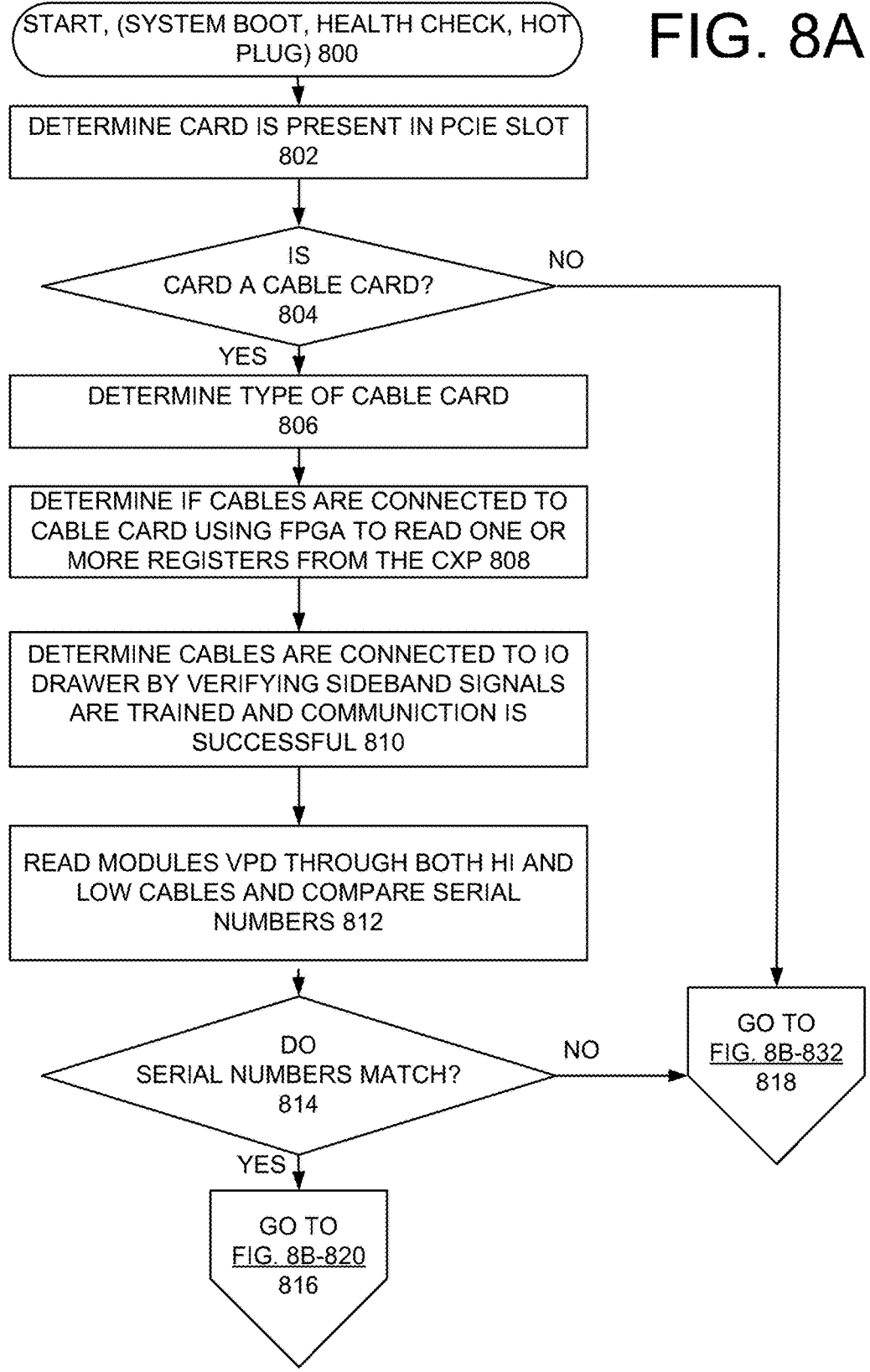

DETECTING AND CONFIGURING OF EXTERNAL IO ENCLOSURE

FIELD OF THE INVENTION

The present invention relates generally to the data processing field, and more particularly, relates to a method, system and computer program product for detecting and configuring an external input/output (IO) enclosure in a computer system.

DESCRIPTION OF THE RELATED ART

Peripheral Component Interconnect Express (PCIE) has become the industry standard IO bus for server computer systems, as well as personal computers (PCs). Traditionally, servers install PCIE IO adapters (IOAs) in slots within a system unit that connect through a PCI host bridge to the system memory and processor buses. IBM POWER and Z series systems have offered external IO enclosures to provide additional PCIE slots beyond those that are available within the system unit. These have in the past been connected to the system unit through IBM proprietary interconnect architectures such as HSL and Infiniband 12X IO loops on IBM POWER systems.

A need exists for detecting an add-in card in a PCI Express (PCIE) slot of a system unit (CEC) in which that add-in card is not a PCIE IO adapter but a card that extends the PCIE link from that slot over cables to a slot or PCIE switch in an external IO enclosure or drawer. A need exists for a mechanism that enables the interchangeable use of system PCIE slots as either IO adapter or cable cards, and that enables these cards to be interchanged at system power on or as part of PCIE slot hot plug operations. A need exists for a mechanism that enables detecting the cable type and connectivity of the cables to the IO drawer, particularly when the cable card provides more than one cable comprising a single PCIE link.

SUMMARY OF THE INVENTION

Principal aspects of the present invention are to provide a method, system and computer program product for detecting and configuring an external input/output (IO) enclosure in a computer system. Other important aspects of the present invention are to provide such method, system and computer program product substantially without negative effects and that overcome many of the disadvantages of prior art arrangements.

In brief, a method, system and computer program product are provided for detecting and configuring an external input/output (IO) enclosure in a computer system. A PCIE Host Bridge (PHB) in a system unit is connected to a plurality of PCIE add-in card slots. One or more cables are connected between the PHB and the external enclosure. System firmware including detecting and configuring functions uses sideband structure for detecting a PCIE cable card and configuring the external input/output (IO) enclosure.

In accordance with features of the invention, using sideband structure system firmware upon system boot or as part of hot plug power on of a PCIE slot detects the presence of a PCIE cable card and obtains status information from the PCIE cable card to determine a cable card type. System firmware uses the sideband structure to determine that cables are connected to that cable card and connected to an IO drawer.

In accordance with features of the invention, system firmware uses the sideband structure to determine the identity of an IO drawer to which each cable of a cable is connected, from among a possible plurality of IO drawers connected to the same system. System firmware determines when one or more of a plurality of cables are connected to different IO drawers. System firmware reports to system management functions and customer user interfaces when cables are incorrectly connected to different IO drawers.

In accordance with features of the invention, upon detecting the connection location of each cable from a PCIE cable card at an IO drawer, system firmware uses the sideband structure to determine each cable is properly connected to convey PCIE lanes from the PHB passing through the cable card and cable to the corresponding PCIE lanes of the PCIE slot or PCIE switch of the IO drawer, thus ensuring that the high and low cables are not swapped. System firmware reports to system management functions and customer user interfaces when cables are incorrectly connected to the IO drawer.

In accordance with features of the invention, system firmware uses the sideband structure to determine when one or more cables within a plurality of cables comprising a single PCIE link is inoperable or disconnected from the cable card or IO drawer, but that the remaining connected cable or cables are able to form an operable PCIE link, although operating at a reduced PCIE link width and corresponding throughput. System firmware reports to system management functions and customer user interfaces when some cables are inoperable or disconnected from the cable card or IO drawer.

In accordance with features of the invention, system firmware uses the sideband structure to determine when one or more cables within a plurality of cables comprising a single PCIE link is inoperable or disconnected from the cable card or IO drawer, and that the remaining connected cable or cables are unable to form an operable PCIE link. System firmware reports to system management functions and customer user interfaces when some cables are inoperable or disconnected from the cable card or IO drawer and that the PCIE link is operating at degraded capacity.

BRIEF DESCRIPTION OF THE DRAWINGS

The present invention together with the above and other objects and advantages may best be understood from the following detailed description of the preferred embodiments of the invention illustrated in the drawings, wherein:

FIGS. 8A and 8B together provide a flow chart illustrating example operations for detecting and configuring an external IO enclosure in accordance with a preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for detecting and configuring an external input/output (IO) enclosure and implementing sideband control structure for Peripheral Component Interconnect Express (PCIE or PCI-Express) PCIE cable cards and input/output (IO) expansion enclosures in a computer system.

Figure 1:
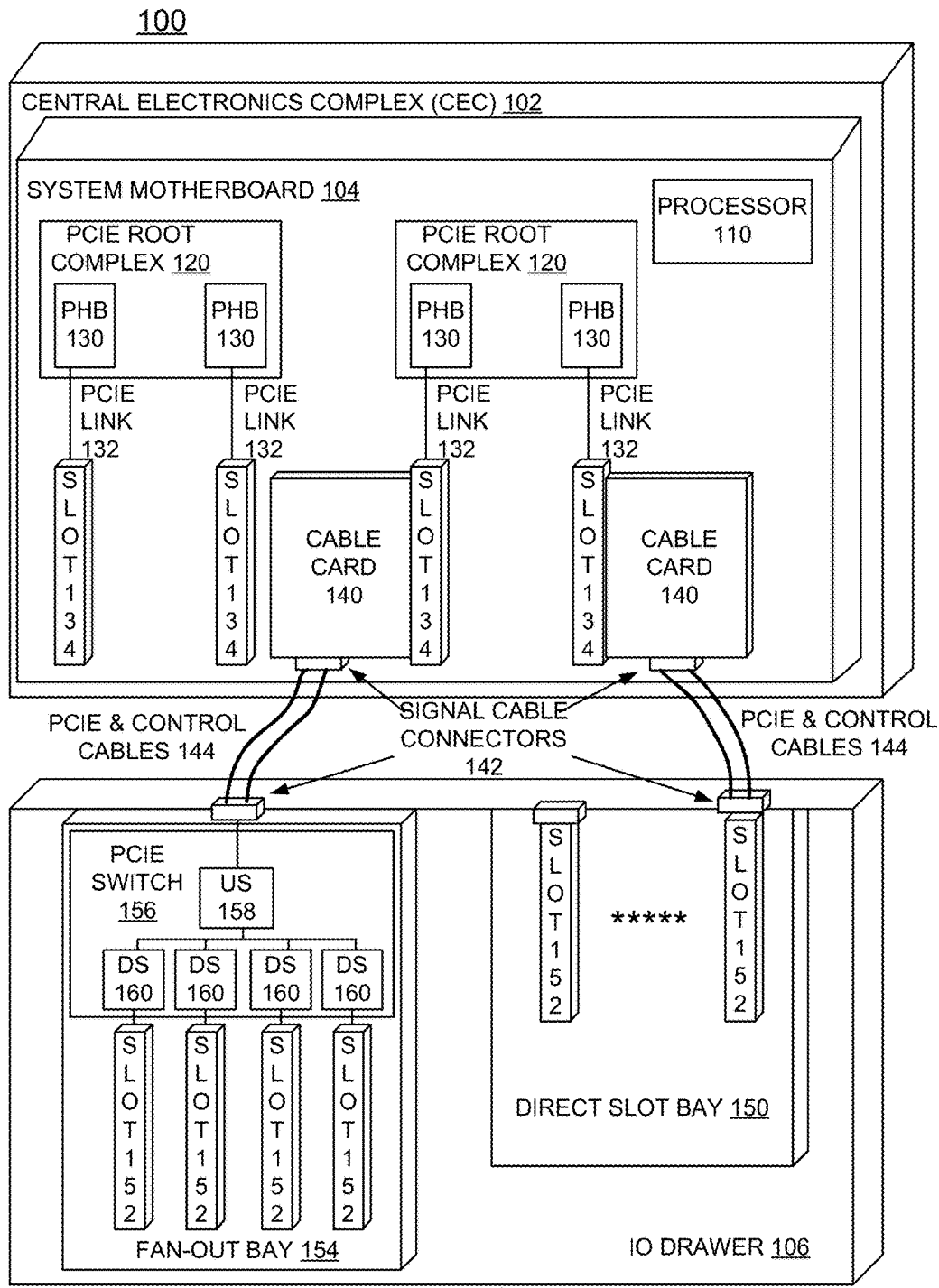
FIG. 1 illustrates an example computer system for detecting and configuring an external input/output (IO) enclosures and implementing sideband control structure for Peripheral Component Interconnect Express (PCIE or PCI-Express) PCIE cable cards and IO expansion enclosures and health check for optical cable attached PCIE enclosures in accordance with a preferred embodiment.

Having reference now to the drawings, in FIG. 1, there is shown an example computer system generally designated by the reference character 100 for detecting and configuring an external input/output (IO) enclosure in accordance with a preferred embodiment. Computer system 100 includes a computer Central Electronics Complex (CEC) 102 that includes a system motherboard 104 common in the art that provides for the physical packaging interconnection of the various components illustrated within the CEC 102. Computer system 100 includes an input/output (IO) expansion enclosure or IO drawer generally designated by the reference character 106 in accordance with a preferred embodiment.

In accordance with features of the invention, the IO drawer 106 is an electrical enclosure that provides PCIE add-in card slots (PCIE slots) or integrated devices utilized by firmware and software operating within the CEC 102 to extend the number of PCIE devices physically configurable within the scope of the CEC.

CEC system motherboard 104 includes one or more processors or central processor units (CPUs), such as processor 110. Processor 110 is suitably arranged for executing firmware and software, such as operating system and applications hosted by respective operating systems in control of the overall computer system 100 in accordance with a preferred embodiment.

CEC system motherboard 104 includes one or a plurality of PCIE root complexes 120. Each PCIE root complex 120 includes one or a plurality of PCIE host bridges (PHBs) 130, each PHB 130 providing a respective PCIE link 132 to a respective PCIE slot 134 mounted commonly on the system motherboard 104. For example, the PCIE link 132 is comprised of a plurality of 16 lanes of PCIE signaling wires and auxiliary signals, such as specified in the PCIE standard. The auxiliary signals include PCIE PERST, also called Fundamental Reset, and PCIE clocks from the PHB 130 to a PCIE device, PCIE card present from a device to a PHB 130, and other such discrete signals that operate independently of the PCIE signaling lanes.

One or more of the PCIE slots 134 includes a respective PCIE cable card 140 including a respective PCIE cable connector 142 connected by a pair of PCIE cables 144 to a corresponding respective PCIE cable connector 142 provided with the IO drawer 106, as shown.

IO drawer 106 includes one or a plurality of module bays, such as a direct slot bay 150 including a plurality of PCIE slots 152, and a fan-out bay 154, including a PCIE switch 156 connected to another plurality of PCIE slots 152, as shown. Each of the direct slot bay 150, PCIE slots 152, and the fan-out bay 154 is connected to the CEC 102 by the individual and independent cables 144 via PCIE cable connectors 142, as shown. The PCIE switch 156 includes an upstream port 158 connected upstream to the PCIE Cable Connector 142 and downstream to a plurality of downstream ports 160, each connected to a respective PCIE slot 152, as shown.

Computer system 100 is shown in simplified form sufficient for understanding the present invention. The illustrated computer system 100 is not intended to imply architectural or functional limitations. The present invention can be used with various hardware implementations and systems and various other internal hardware devices.

In accordance with features of the invention, one or a plurality of cables 144 is provided with each cable card 140 and respective PCIE slot 152 or PCIE switch 156. As shown, a pair of PCIE cables 144 convey PCIE signal lanes and auxiliary signals forming a single PCIE link, and the PCIE cables 144 also convey sideband control and status signals between the CEC 102 and the IO drawer 106. The use of two cables 144 for each single PCIE link between the CEC 102 and IO drawer 106 advantageously enables redundancy in the event of a cable failure. Only a single cable 144 is utilized in communicating sideband controls and status between the CEC and IO drawer, and each of the two cables 144 provides an alternative signaling path to communicate such sideband controls.

In accordance with features of the invention, the cables 144 may be conventional copper cables or fiber optic cables employing opto-electronic transceivers at each cable end. For example, with relatively short distances, such as inches to a few feet, copper cables 144 are generally suitable for conveying PCIE lanes operating at required PCIE signaling rates between the CEC 102 and IO drawer 106. Optical cables 144 advantageously provide electrical isolation to enable high signaling rates over longer distances, such as one to many meters.

In accordance with features of the invention, use of optical PCIE cables 144 includes serializing required DC signals over the optical cables 144 and then converting the serialized signals back to DC signals at the other end of the optical PCIE cables 144 at CEC 102 or the IO drawer 106.

In accordance with features of the invention, firmware operating in the CEC 102 is enabled to determine a type of cable card 140 plugged into a PCIE slot 134, with a plurality of different such cable card types having differing properties, such as whether the cables 144 are copper or optical, how many cables 144 emanate from the cable card 140, and the like. It is similarly advantageous for firmware operating in the CEC 102 to be able to determine whether the cables 144 are actually connected to an IO drawer 106, and what type of IO drawer 106, and the IO module bay 150, or module bay 156, is connected to cables 144.

In accordance with features of the invention, in a logically partitioned computer system 100 firmware operating in the CEC 102 is enabled to assign respective CEC PCIE slots 134 to a particular logical partition when that slot 140 contains a PCIE IO adapter or firmware operating in the CEC 102 is enabled to detect a cable card 140 and to assign respective CEC PCIE slots 152 to different logical partitions with the cable card 140 connected to an IO drawer 106.

Figure 2A:
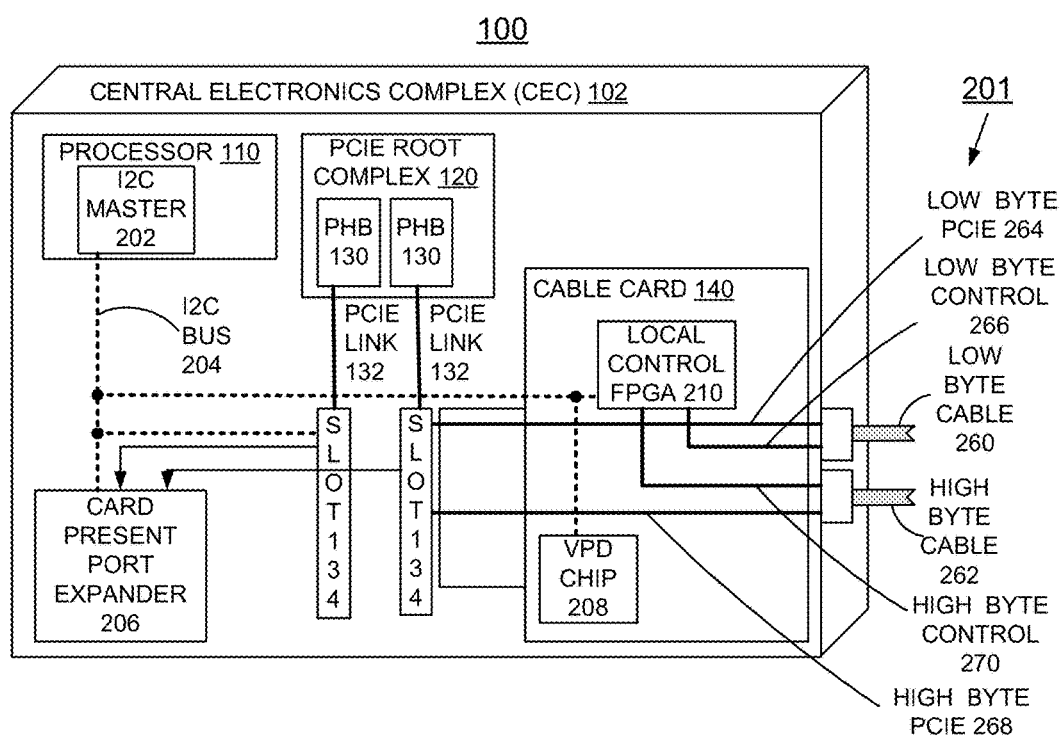
FIGS. 2A, and 2B illustrates cable card and sideband controls of the example system of FIG. 1 in accordance with a preferred embodiment.
Figure 2B:
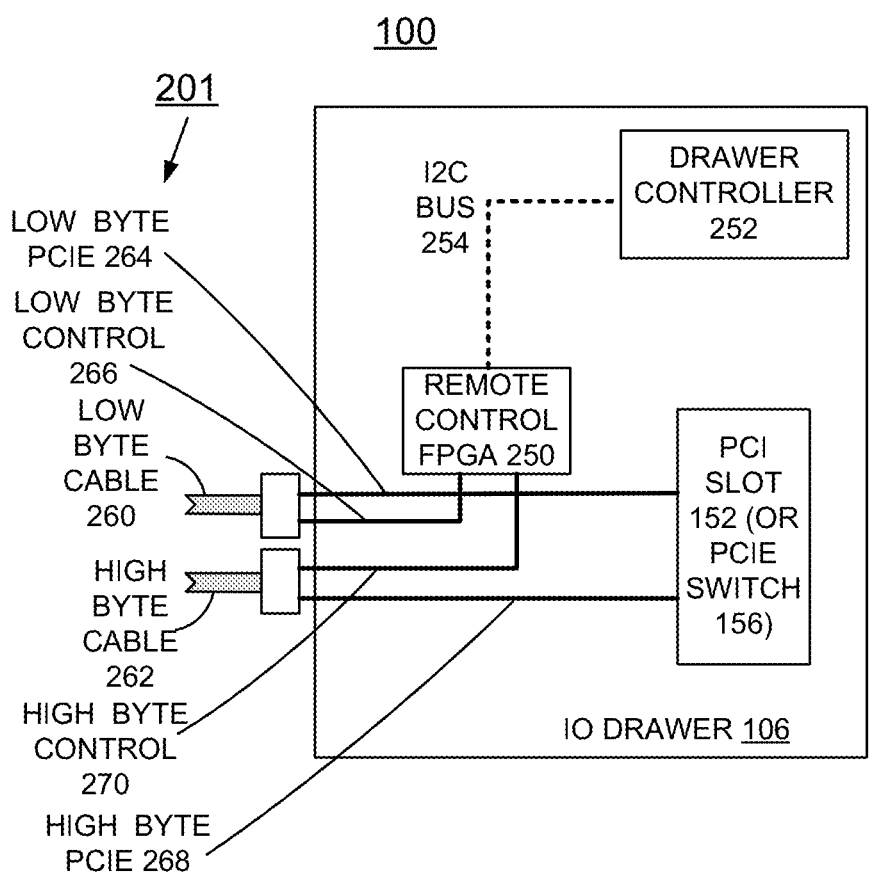

Referring also to FIGS. 2A, and 2B, additional example details of novel cable card 140 and sideband controls generally designated by the reference character 201 are shown of computer system 100 of FIG. 1 in accordance with a preferred embodiment. As shown in FIG. 2A, included within or accessible to the processor 110 is an Inter-Integrated Circuit (I2C) master device 202, which is the master of an I2C bus 204 utilized as an IO bus of the sideband signaling apparatus of a preferred embodiment. It should be understood that other such IO buses known in the art may be suitable to substitute for the I2C bus 204 utilized by the invention. Within CEC 102, the I2C bus 204 is connected between the I2C master device 202 and a card present port expander 206, PCIE slots 134, a vital product data (VPD) chip 208, and a local control field programmable gate array (FPGA) 210 provided within the cable card 140.

The PCIE cable card 140 utilizes pins within the PCIE connector 142 of the PCIE slot 134 defined in PCIE as reserved pins to generate a signal identifying the PCIE cable card 140 as a cable card. The card present port expander 206 connected on the I2C bus 204 receives a card present signal from the cable card 140 uniquely indicating the presence of a cable card, as opposed to a PCIE IO adapter. Firmware operating in the CEC 102 utilizes the I2C master 202 to read registers within the card present port expander 206 in order to determine that the cable card 140 is plugged in the respective PCIE card slot 134. It should be understood that other devices than the card present port expander 206 could be used to receive cable card present information in a manner accessible to firmware operating within the CEC 102.

The local control FPGA 210 includes registers that receive status from and optionally signal controls to other hardware components located on the cable card 140. The registers within the local control FPGA 210 are connected to the I2C bus 204 proceeding from the PCIE slot 140 onto the cable card 140.

Referring also to FIG. 2B, the IO drawer 106 similarly includes a remote control FPGA 250. The remote control FPGA 250 includes registers that receive signals from other hardware components internal to the IO drawer 106. The IO drawer 106 includes a drawer controller 252 coupled to the remote control FPGA 250 via an I2C bus 254.

In accordance with features of the invention, as shown in FIGS. 2A, and 2B, sideband controls 201 are coupled between the local control FPGA 210 in the CEC 102 and the remote control FPGA 250 in IO drawer 106 by a low byte cable 260 and a high byte cable 262. For example, the low byte cable 260 conveys PCIE lanes 0 through 7 of the PCIE link from the PCIE slot 134, shown as Low Byte PCIE 264, and conveys sideband signals between the cable card 140 and the IO drawer 106, shown as Low Byte Control 266. For example, the high byte cable 262 conveys PCIE lanes 8 through 15 of the PCIE link from the PCIE slot 134, shown as High Byte PCIE 268, and conveys sideband signals between the cable card 140 and the IO drawer 106, shown as High Byte Control 270. For example, the high byte cable 262 serves as an alternate or redundant connection to the low byte cable 260 for the purpose of conveying sideband signals.

Using either the low byte control 266 or high byte control 270, the remote control FPGA 250 signals changes in the states of various hardware components or DC voltage signals within the IO drawer 106 to the local control FPGA 210, which receives these changes in registers accessible to firmware operating in the CEC 102. Similarly, firmware operating in the CEC 102 may set register values in the local control FPGA 210 directed at the remote control FPGA 250 to change the state of hardware components or DC voltage signals within the IO drawer 106.

Using the either the low byte control 266 or high byte control 270, the local FPGA 210 communicates local FPGA 210 register changes to the remote control FPGA 250. The registers within the remote control FPGA 250 connect to the I2C bus 254 within the IO drawer 106. The remote FPGA registers are also accessible as I2C devices from the local control FPGA 210. Firmware operating in the CEC 102 utilizes registers in the local control FPGA 210 to create I2C bus operations transmitted between the local control FPGA 210 and remote control FPGA 250 utilizing the low byte control 266 or high byte control 270. The local control FPGA 210 enables firmware operating within the CEC 102 to determine various configuration and operational states of hardware components or DC voltage signals located on the cable card 210 as well as hardware components or DC voltage signals within the IO drawer 106.

The drawer controller 252 connected to the remote control FPGA 250 within the IO drawer 106 monitors or manages states of the hardware internal to the IO drawer, such as turning on or off power supplies within the drawer, monitoring thermal or electrical states of components within the drawer, taking actions in response to particular thermal or electrical states or thresholds, and the like. The drawer controller 252 connects to the remote control FPGA 250 utilizing the I2C bus 370, enabling the drawer controller 252 to read or write registers within the remote control FPGA 250 and to communicate status to or receive control information communicated from the local control FPGA 210 using the low byte control 266 or high byte control 270.

Figure 3A:
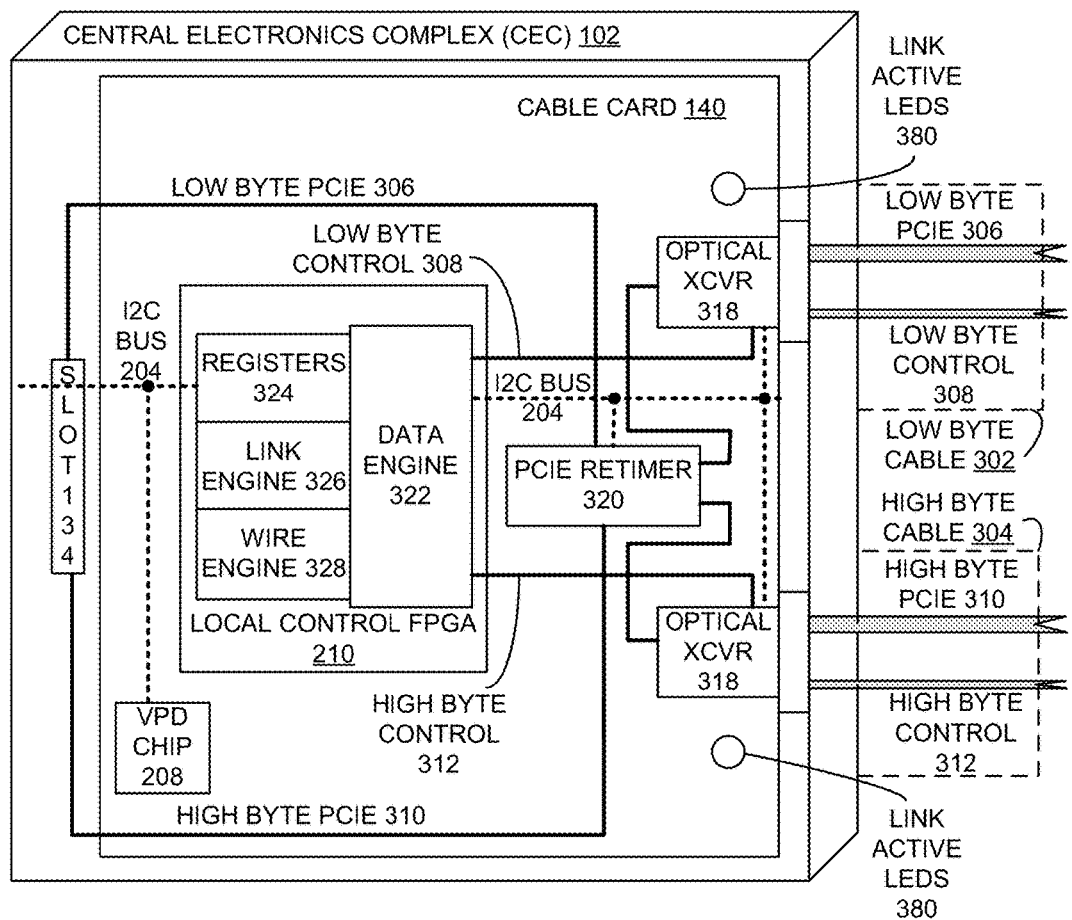
FIGS. 3A, and 3B illustrates further details of Local and Remote FPGA Controllers of the example system of FIG. 1 in accordance with a preferred embodiment.
Figure 3B:
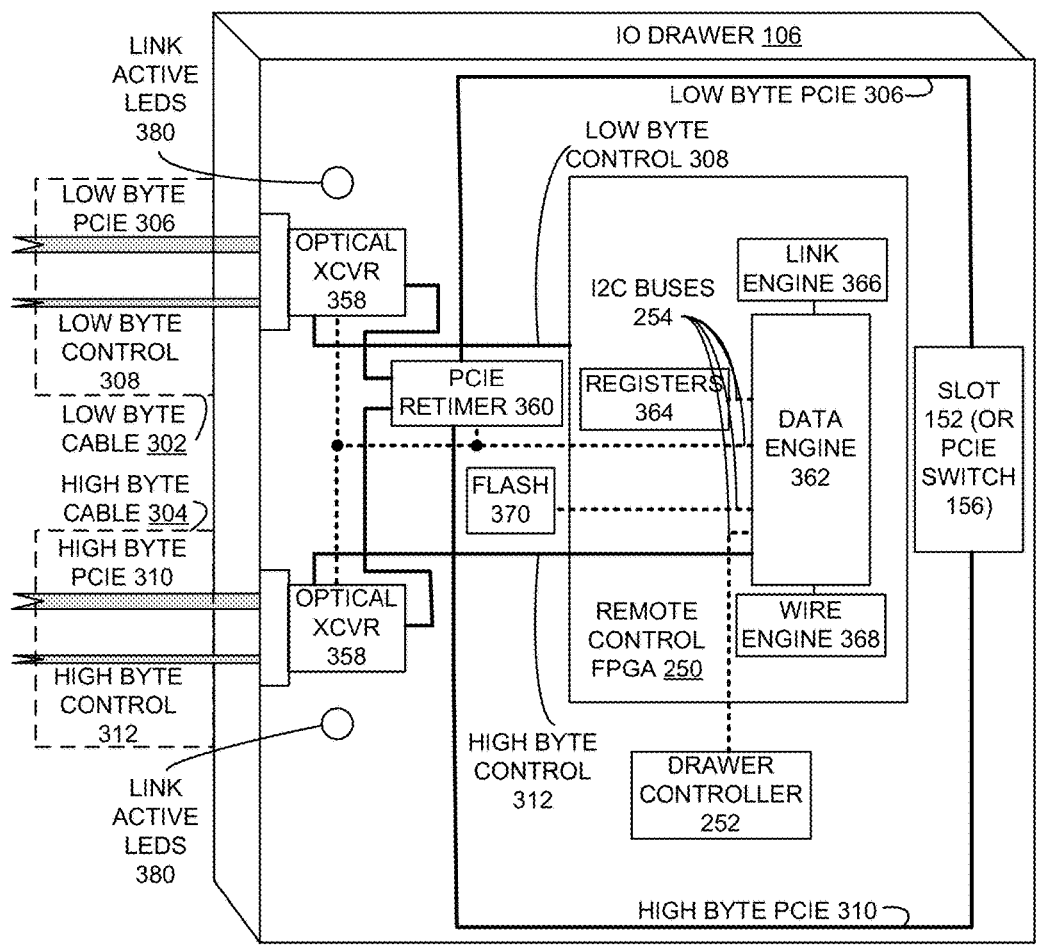

Referring also to FIGS. 3A, and 3B, additional example details of novel local control and remote control FPGAs 210, 250 are shown of the example system 100 of FIG. 1 in accordance with a preferred embodiment.

The cable card 140 is shown connected to the IOA drawer 106 utilizing a low byte cable 302 and a high byte cable 304. The low byte cable 302 conveys the low byte PCIE signals 306 representing PCIE lanes 0 to 7 and control signals between the local FPGA 210 and remote FPGA 250 indicated as low byte control 308. The high byte cable 304 conveys the high byte PCIE signals 310 representing PCIE lanes 8 to 15 and control signals between the local FPGA 210 and remote FPGA 310 indicated as high byte control 312. The signals conveyed by means of the low byte control 308 and high byte control 312 signals may be communicated over either or both of the low byte cable 302 and the high byte cable 304 at any one time, such that each cable can convey the control signals as a backup for the other in the event of failure or disconnection of one cable 302 or 304, and such that signals may be communicated over both cables in order to detect the location to which each cable is connected at the IO drawer 106.

The low byte control 308 and low byte PCIE 306 signals in the low byte cable 302, and the high byte control 312 and high byte PCIE 310 signals in the high byte cable 304 are conveyed optically utilizing a respective optical transceiver (XCVR) 318 on the cable card 140 and optical transceiver (XCVR) 358 in the IO drawer 106. The PCIE lanes 0 to 7 conveyed on the low byte PCIE 306 and lanes 8 to 15 conveyed on the high byte PCIE 310 commonly pass through a PCIE re-timer 320 in FIG. 3A, a PCIE re-timer 360 in FIG. 3A in order to synchronize them with the respective optical transceivers 318, 358 shown in FIGS. 3A and 3B.

The local control FPGA 210 on the cable card 140 includes a local FPGA data engine 322, registers 324, a link engine 326, and a wire engine 328. The remote control FPGA 250 similarly includes a remote FPGA data engine 362, registers 364, a link engine 366, and a wire engine 368, and optionally a flash memory 370 coupled to the data engine 362. The local control FPGA data engine 210 and remote control FPGA data engine 250 are capable of exchanging control signals utilizing either the low byte control 308 or high byte control 312 conveyed over the low byte cable 302 or high byte cable 304, respectively. The link engine 326 utilizes the data engine 322 to establish reliable optical signaling and bit transfer protocols between the optical XCVRs 318 on the cable card 140 and the optical XCVRs 358 and data engine 362 in the IO drawer 106 over both of the low byte cable 302 and high byte cable 304.

The wire engine 328 of local control FPGA 210 receives the state of certain bits of the registers 324 or DC voltage signals and utilizes the data engine 322 to transmit these states to the registers 364 of the remote control FPGA 250. The registers 324 include a predefined bit to assert the state of the PCIE auxiliary PERST DC voltage signal output from a PHB 130 to a device attached to the respective PCIE link, and a bit to receive the state of PCIE auxiliary device present DC voltage signal from a PCIE slot 152 in the IO drawer 106 connected to the PCIE link over the low byte cable 302 and high byte cable 304. When the state of certain bits of registers 324 changes, the wire engine 328 of the local FPGA 210 automatically communicates these to registers 364 of the remote FPGA 250. The wire engine 368 of remote control FPGA 250 receives the state of certain bits of the registers 364 or DC voltage signals and utilizes the data engine 362 to transmit these states to the registers 324 of the local control FPGA 210. Whenever the state of these certain bits of registers 364 changes, the wire engine 368 automatically communicates these to registers 324 of the local control FPGA 210.

The respective wire engine 328, 368 on each on each end of the optical cables 302, 304 provide an alternative signaling mechanism for PCIE auxiliary signals or other DC voltage signals within the fiber optic cables to establish or receive the active or inactive state of the auxiliary signals at the respective other end of the cable.

The registers 324 of local control FPGA 210 include bits representing various properties of the cable card 140, such as the type of the cable card itself, the type and connection states of the low byte cable 302 and high byte cable 304. The registers 324 include bits to detect the states of certain hardware inputs from or control the states of certain hardware outputs to the components of the cable card 140. The registers 324 of local control FPGA 210 include bits representing various properties of the cable connections to that IO drawer, such as representing which location on the IO drawer 106 of the low byte cable 302 and high byte cable 304 are connected, to enable firmware to determine that cables are properly connected.

The cable card 140 and the IO drawer 106 optionally includes Link Active LEDs 380 in association with each of the low byte cable 302 and high byte cable 304. Firmware operating in the CEC 102 utilizes bits within the registers 324 of the local control FPGA 210 to active or deactivate the link active LEDs 380 to indicate that the cable is or is not actively transmitting signals between the cable card 140 and IO drawer 106. Firmware operating in the CEC 102 performs other control and communications operations, such as activating or deactivating power to the IO drawer 106, a bay 150, or 154, PCIE slots 152, or other components within the IO drawer 106.

Figure 4:
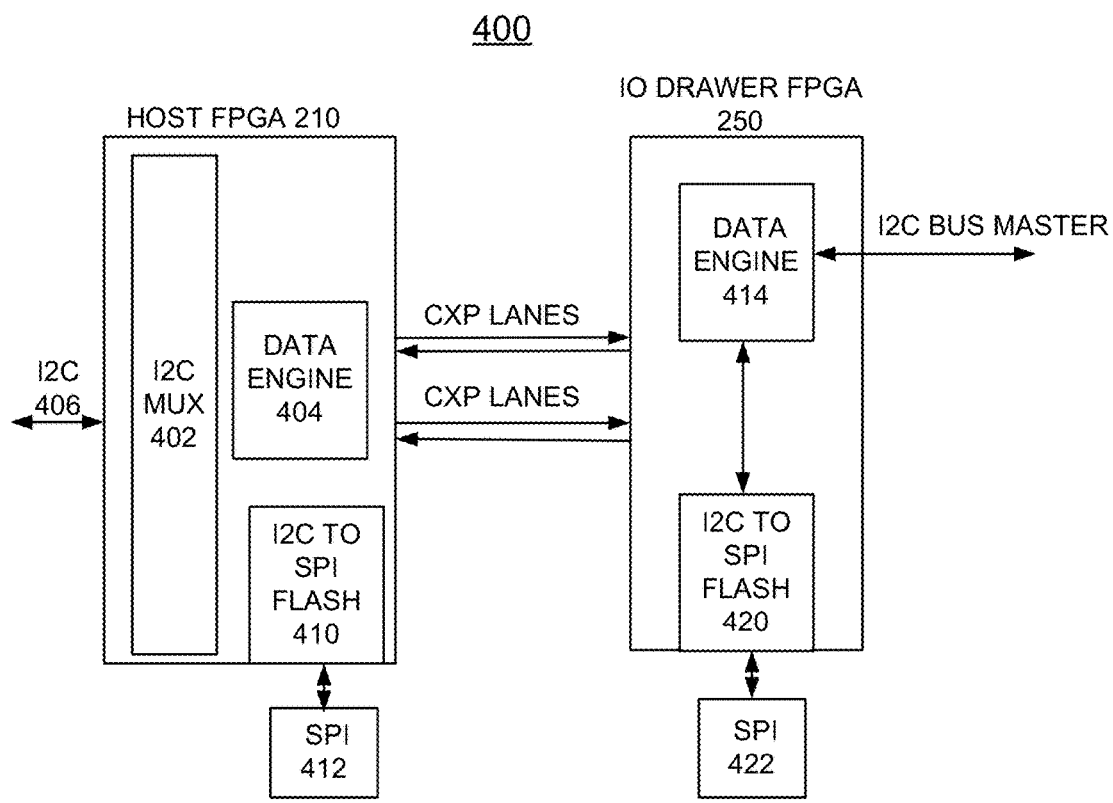
FIG. 4 illustrates example operational features of a physical layer view of I2C multiplexer (MUX) and data engine at host side and IO drawer end of the example system of FIG. 1 in accordance with a preferred embodiment.

Referring to FIG. 4, there are shown example operational features generally designated by the reference character 400 of a physical layer view of the example system 100 of FIG. 1 in accordance with a preferred embodiment. An I2C multiplexer (MUX) 402 and a respective data engine 404, 414 and an I2C SPI flash 410, 420 at host side FPGA 210 and IO drawer side FPGA 250 are shown connected by CXP lanes. A respective SPI flash 412, 422 is coupled to the I2C SPI flash logic 410, 420 at host side FPGA 210 and IO drawer side FPGA 250. The I2C multiplexer (MUX) 402 and the respective data engine 404, 414 enable access secondary I2C buses in a consistent manner. The secondary I2C bus 254 could be in the IO drawer 106 talking to the drawer controller 252 or it could be the I2C bus 204 to each of the cable connector.

Figure 5:
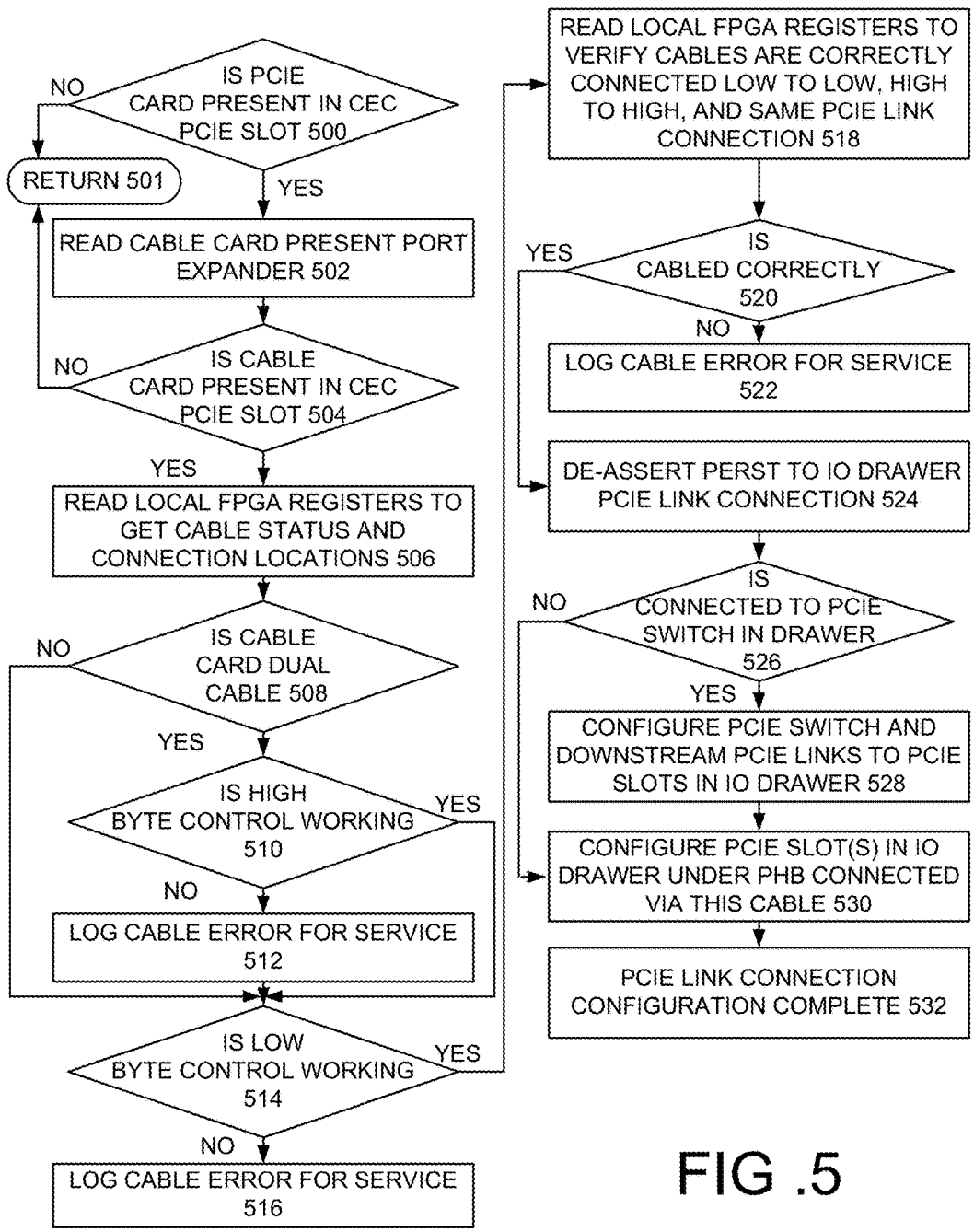
FIG. 5 is a flow chart illustrating example firmware operational features using sideband status information of the example system of FIG. 1 in accordance with a preferred embodiment.

Referring to FIG. 5, there is shown a flow chart illustrating example firmware operational features using sideband status information of the example system 100 in accordance with a preferred embodiment.

As indicated in a decision block 500, checking for a PCIE card present in CEC PCIE slot is performed. When a PCIE card is not present in CEC PCIE slot, then operations return as indicated in a block 501. When a PCIE card is present in CEC PCIE slot, the cable card present port expander is read as indicated in a block 502. As indicated in a decision block 504, again checking for the PCIE cable card present in CEC PCIE slot is performed. When a PCIE cable card is not present in CEC PCIE slot, then operations return at block 501.

When a PCIE cable card is present in CEC PCIE slot, the local FPGA registers are read to get cable status and connection locations as indicated in a block 506. Checking if the cable card includes a pair of cables or dual cables is performed as indicated in a decision block 508. When the cable card includes dual cables, checking is performed to determine if the high byte control is working as indicated in a decision block 510. If the high byte control is not working, a cable error is logged for service as indicated in a block 512. If the high byte control is working and when the cable card does not include dual cables, checking is performed to determine if the low byte control is working as indicated in a decision block 514. If the low byte control is not working, a cable error is logged for service as indicated in a block 516.

As indicated in a block 518, local FPGA registers are read to verify cables are correctly connected low to low, high to high, and same PCIE link connection at the IO drawer.

Checking if cabled correctly is performed as indicated in a decision block 520. If not cabled correctly, a cable error is logged for service as indicated in a block 522. If cabled correctly, PERST to the IO drawer PCIE link connection is de-asserted as indicated in a block 524. Checking is performed to determine if connected to PCIE switch in IO drawer as indicated in a decision block 526. When connected to PCIE switch in IO drawer, the PCIE switch and downstream PCIE links to PCIE slots in the IO drawer are configured as indicated in a block 528. The PCIE slot or PCIE slots in the IO drawer under the PHB connected to this cable are configured as indicated in a block 530 following block 528 and following decision block 526 if not connected to PCIE switch in IO drawer. The PCIE link connection configuration is complete as indicated in a block 532.

Figure 6A:
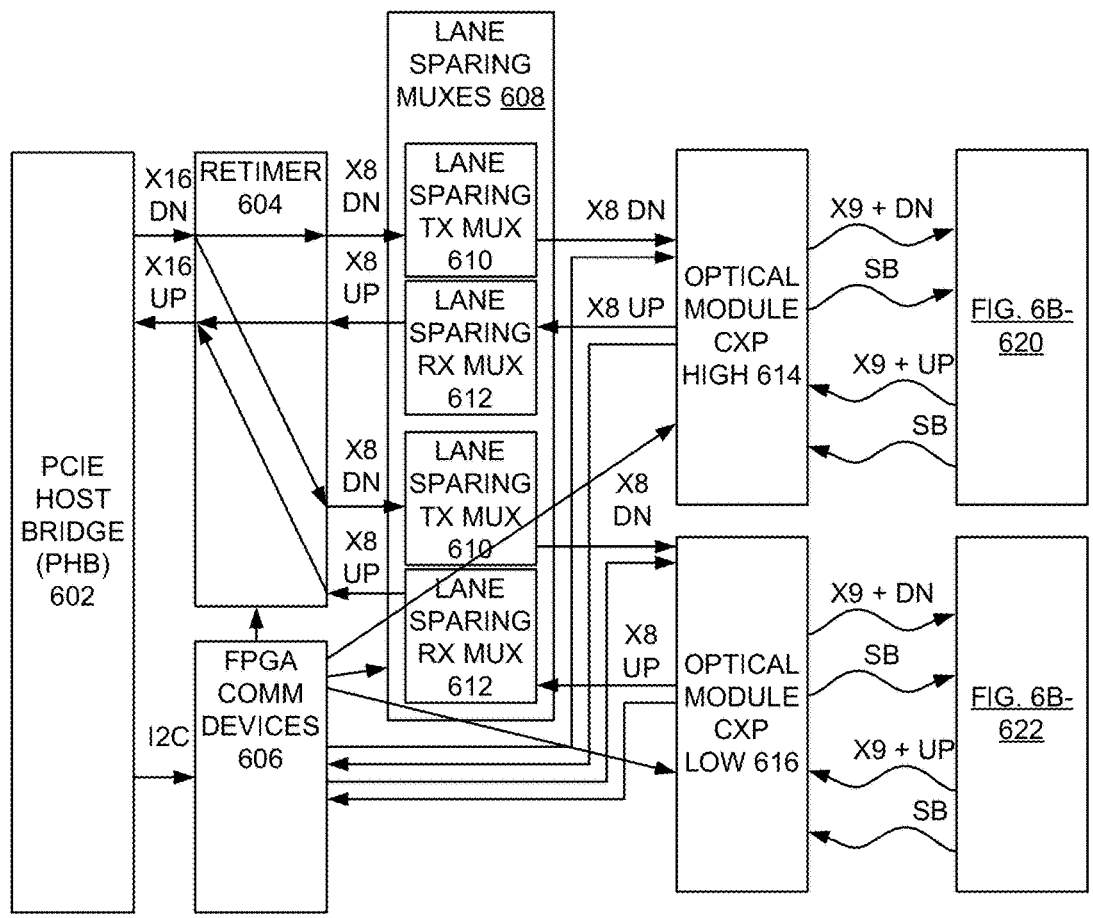
FIGS. 6A and 6B together illustrate example PCI bus topology of the example system of FIG. 1 in accordance with a preferred embodiment.
Figure 6B:
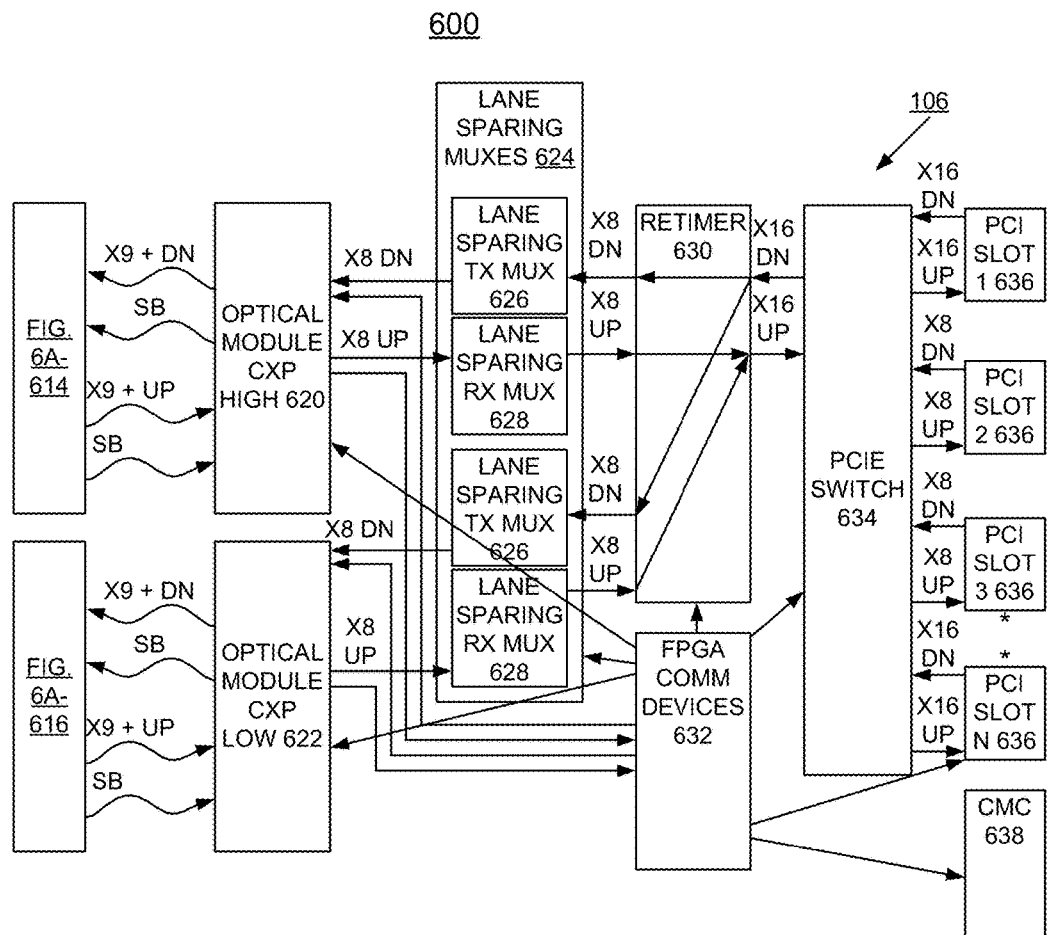

Referring to FIGS. 6A and 6B, there is shown example PCI bus generally designated by the reference character 600 of the example system 100 in accordance with a preferred embodiment. The illustrated PCI bus 600 provides a path from a PCIE host bridge (PHB) 602 to an optical cable attached IO drawer 106. For example, two 12 lane optical cables are used to carry PCIE and sideband traffic between the system PHB 602 and the IO drawer 106. Each cable contains 8 lanes of PCIE traffic, 1 channel of sideband communication and 1 spare optical channel with two channels unused. With one cable carrying PCIE lanes 0-7 (low byte) and the other carrying PCI lanes 8-15 (high byte) together they make a x16 PCIE bus connection to the IO drawer 106. The one spare optical channel per cable in each direction allows firmware to route a single PCIE lane away from a faulted channel to the spare channel when firmware determines a channel that is faulted. Other implementations could use, for example two unused channels as spares for the PCIE links as well.

As shown in FIG. 6A, PCI bus 600 includes a PCIE retimer 604, field programmable gate array (FPGA) communication devices 606, lane sparing multiplexers (muxes) 608 including lane sparing transmit (TX) muxes 610, and lane sparing receive (RX) muxes 612, and High and Low optical module transceivers (CXPs) 614, 616 with respective optical connections X9+DN, SB, X9+UP, SB. For example, with each optical cable containing 12 channels of bidirectional traffic, eight of those lanes optionally are used for PCIE, one used for sideband communication SB and one of the unused channels wired to be used as a spare PCIE lane. As shown, the FPGA communication devices 606 are connected to the PCIE retimer 604, High and Low optical module transceivers (CXPs) 614, 616, and the lane sparing multiplexers (muxes) 608.

As shown in FIG. 6B, PCI bus 600 includes High and Low optical module transceivers (CXPs) 620, 620 that are connected to the High and Low optical module transceivers (CXPs) 614, 616 of FIG. 6A with the respective optical connections X9+DN, SB, X9+UP, SB. PCI bus 600 includes lane sparing multiplexers (muxes) 624 including lane sparing transmit (TX) muxes 626, and lane sparing receive (RX) muxes 628; a PCIE retimer 630, field programmable gate array (FPGA) communication devices 632, and a PCIE switch 634 of the IO drawer 106. As shown, the PCIE switch 634 is connected to a plurality of PCI slots 636 #1-N, for example, 6 PCI slots 636 of the IO drawer 106. As shown, the FPGA communication devices 632 are connected to the PCIE retimer 630, High and Low optical module transceivers (CXPs) 620, 620, lane sparing multiplexers (muxes) 624, and connected to the PCIE switch 634, a drawer controller (CMC) 638 and the PCI slots 636 of the IO drawer 106.

Figure 7:
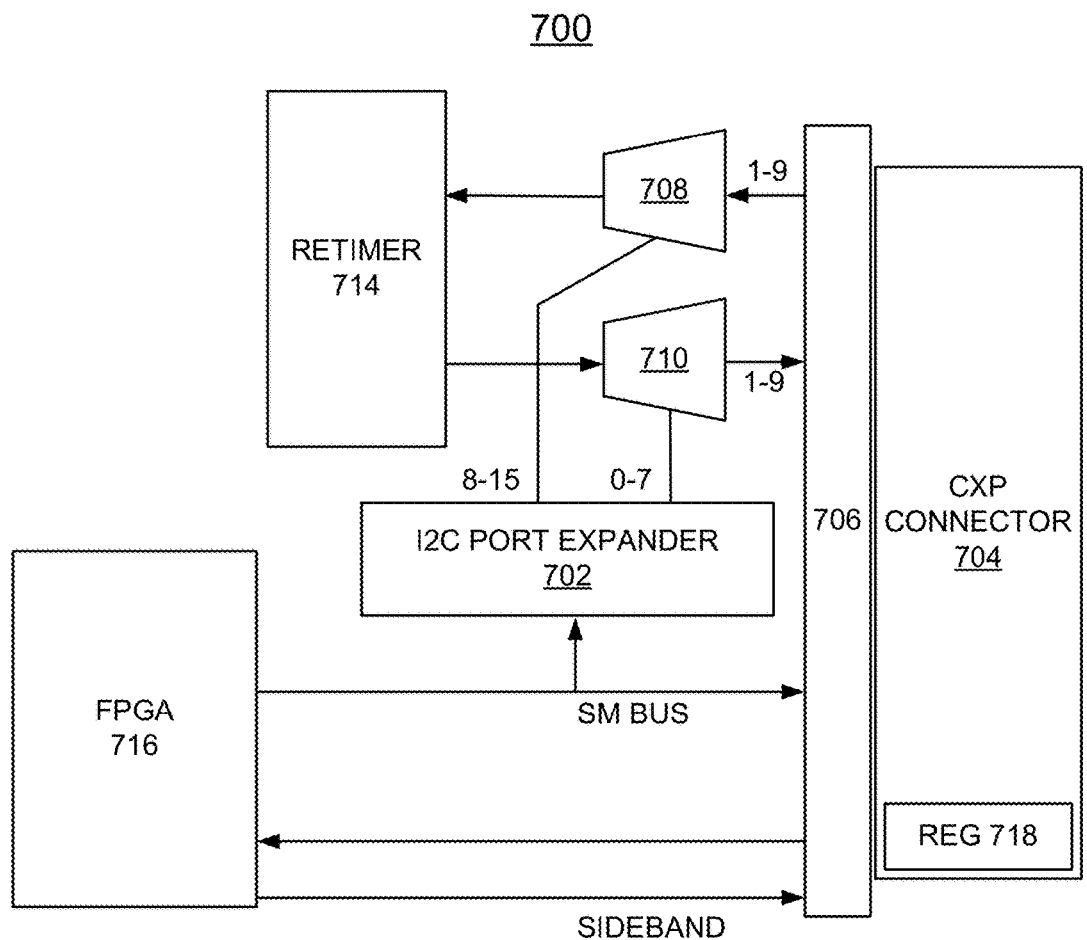
FIG. 7 illustrate example lane sparing hardware of the example system of FIG. 1 in accordance with a preferred embodiment.

Referring to FIG. 7 there is shown example lane sparing hardware generally designated by the reference character 700 of the example system 100 in accordance with a preferred embodiment. Lane sparing hardware 700 is used to reroute PCIE lanes to a spare optical channel on both ends of the optical path in accordance with a preferred embodiment. As shown, lane sparing hardware 700 includes an I2C port expander device 702 coupled to an optical transceiver (CXP) connector 704 by a CXP interface block 706.

The I2C port expander device 702 is used to control a set of PCIE lane multiplexers (muxes) 708, 710. As shown, lane sparing hardware 700 includes a retimer 714 coupled to the PCIE lane muxes 708, 710, a field programmable gate array (FPGA) 716 coupled by sideband and SM bus to the CXP interface block 706 and CXP connector 704 and coupled to the I2C port expander device 702. Lane sparing hardware 700 includes control and status registers 718 included with the CXP connector 704.

Interrogating PCIE retimers, such as retimer 714 can be used to determine the faulted optical channel. For example, by reading retimer registers it is possible to determine for each PCI lane what stage of the PCIE link training sequence has been initiated. This information can be used to determine if one lane has not progressed at all which indicates a bad optical channel. By reading transmit status registers in the optical transceivers it is possible to determine for each if a fault has occurred. This information can be used to determine a bad optical channel. By reading receiver status registers 718 in the optical transceivers 704 it is possible to detect a loss of signal from the host and this information can be used to determine a bad optical channel.

By programming muxes in the PCIe path firmware can reroute PCIE away from the faulted channel. The I2C port expander device 702 is controlled through the FPGA 716, for example using I2C communication through the sideband signals. When the I2C port expander device 702 is programmed by firmware it changes the input to output mapping of the PCIE lane muxes 708, 710 which causes the PCIe bus to be rerouted down a different optical channel. When the operation is complete a reset sequence can be initiated on the PCIE bus to recover the link to its optimal width.

Figure 8B:
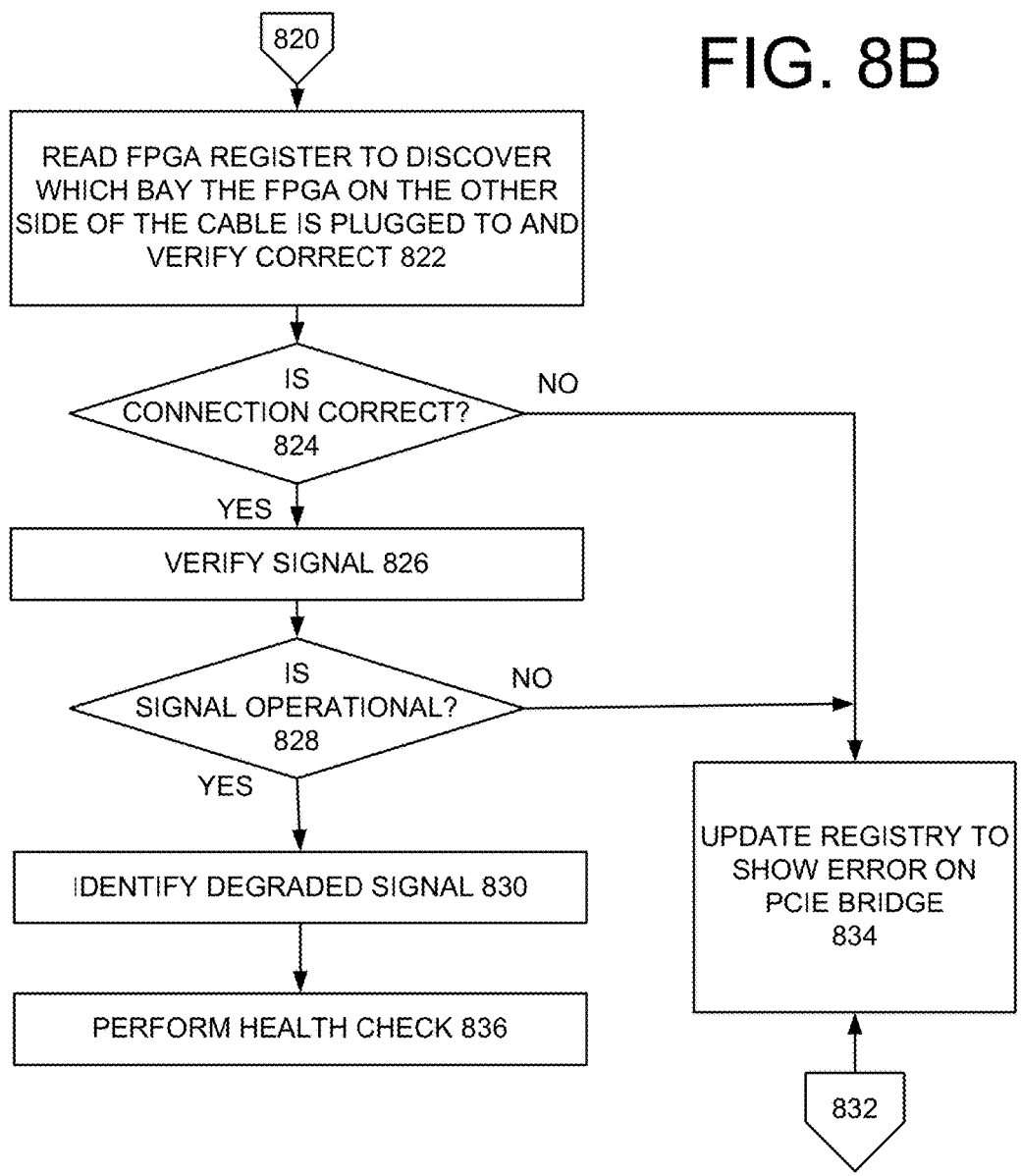

Referring to FIGS. 8A and 8B, there is shown a flow chart illustrating example operations for detecting and configuring an external IO enclosure such as IO drawer 106 in accordance with a preferred embodiment starting at a block 800, for example, upon system boot, health check, or as part of hot plug power on of a PCIE slot. For example, system firmware upon system boot or as part of hot plug power on of a PCIE slot determines that a card present in the slot as indicated in a block 802. As indicated in a decision block 804, checking whether the card is a cable card is performed. For example, the determination that a cable card is present is performed through an I2C device on the card planar which detects a cable card through a reserved pin pulldown. As indicated in a block 806 when the card is a cable card, the type of cable card is determined from a possible plurality of card types, including but not limited to cable cards having a single cable to connect to the IO drawer; cards having a plurality of cables further indicating the number of such cables and correlation to signals comprising a PCIE link and sideband communications; whether the cable or cables are copper or optical cables; and other status information useful for uniquely identifying the type of interchangeable cable cards. For example, this determination is accomplished through reads of preprogrammed defined registers in the FPGA, these registers are either hardcoded or manipulated through hardware presence detects during the FPGA's initialization sequence.

System firmware utilizes sideband structure to further determine that cables are connected to an IO drawer, for example, this is performed by reading one or more FPGA registers as indicated in a block 808. Verifying that the sideband signals are trained and communication with the drawer has been successful is performed to determine that cables are connected to an IO drawer as indicated in a block 810.

Modules Vital Product Data (VPD) is read through both high and low cables and serial numbers are compared as indicated in a block 812. Checking if the serial number match is performed as indicated in a decision block 814. As indicated in a block 816, if the serial numbers match, then operations continue at block 820 in FIG. 8B. As indicated in a block 818, if the serial numbers do not match, then operations continue at block 832 in FIG. 8B.

Following block 820 in FIG. 8B, system firmware utilizes sideband structure to further determine the identity of an IO drawer to which each cable of the cables is connected and verify the connection is correct, from a possible plurality of IO drawers connected to the same system as indicated in a block 822. System firmware can determine that one or more of a plurality of cables are connected to different IO drawers by reading the modules VPD through both the high and low cables and comparing the discovered serial numbers, and verifying that they match. System firmware can determine that one or more of a plurality of cables are connected to different IO drawers by checking the serial numbers of the optical transceivers (CXPs) on both ends of the active optical cable (AOC) for each cable and verify that they match.

Checking if the connection is correct is performed as indicated in a decision block 824. upon detecting the connection location of each cable from a cable card at an IO drawer, system firmware determines if each cable is properly connected to convey PCIE lanes from the PHB passing through the cable card and cable to the corresponding PCIE lanes of the PCIE slot or PCIE switch of the IO drawer, thus ensuring that the high and low cables are not swapped. For example, this is performed by reading a register in the local FPGA, the value of this register is fed through the sideband signals from pulldowns to the drawerside, remote FPGA. System firmware reports to system management functions and customer user interfaces that cables are incorrectly connected to the IO drawer as indicated in a block 834.

For example, system firmware can determines that one or more cables within a plurality of cables comprising a single PCIE link is inoperable or disconnected from the cable card or IO drawer, but that the remaining connected cable or cables are able to form an operable PCIE link, although operating at a reduced PCIE link width and corresponding throughput. For example, trained capacity of the link is determined by reading the link width from the PHB, additional data can then be gathered from the FPGA. System firmware reports to system management functions and customer user interfaces that some cables are inoperable or disconnected from the cable card or IO drawer.

Signal integrity is verified as indicated in a block 826. Checking if the signal is operational is performed as indicated in a decision block 828. System firmware utilizes sideband structure to determine if one or more cables within a plurality of cables comprising a single PCIE link is inoperable or disconnected from the cable card or IO drawer, and that the remaining connected cables are unable to form an operable PCIE link. For example, trained capacity of the link is determined by reading the link width from the PHB, and additional data can be gathered from the FPGA. System firmware reports to system management functions and customer user interfaces that some cables are inoperable or disconnected from the cable card or IO drawer, for example at block 834.

If the signal is operational, determining if the signal is degraded as indicated in a block 830. For example, system firmware reports to system management functions and customer user interfaces when cables are incorrectly connected to different IO drawers as indicated in a block 834. When determined that the signal is degraded, a health check is performed as indicated in a block 836.

Figure 9:
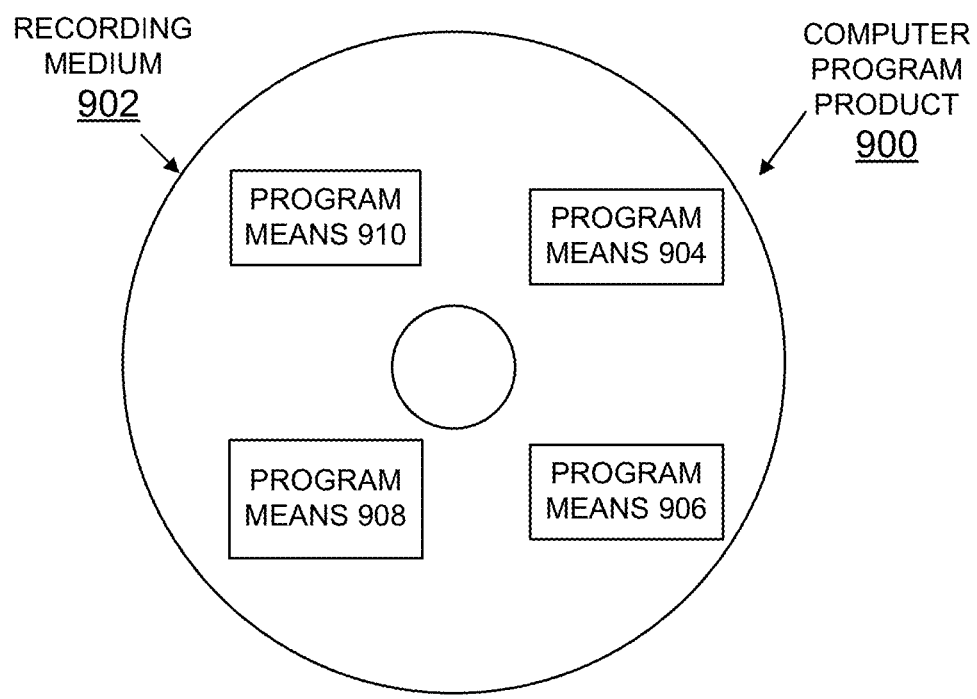
FIG. 9 is a block diagram illustrating a computer program product in accordance with the preferred embodiment.

Referring now to FIG. 9, an article of manufacture or a computer program product 900 of the invention is illustrated. The computer program product 900 is tangibly embodied on a non-transitory computer readable storage medium that includes a recording medium 902, such as, a floppy disk, a high capacity read only memory in the form of an optically read compact disk or CD-ROM, a tape, or another similar computer program product. Recording medium 902 stores program means 904, 906, 908, and 910 on the medium 902 for carrying out the methods for detecting and configuring of an external enclosure, such as IO drawer 106 of preferred embodiments in the system 100 of FIG. 1.

A sequence of program instructions or a logical assembly of one or more interrelated modules defined by the recorded program means 904, 906, 908, and 910, direct the computer system 100 for detecting and configuring detecting and configuring of an external enclosure of a preferred embodiment.

While the present invention has been described with reference to the details of the embodiments of the invention shown in the drawing, these details are not intended to limit the scope of the invention as claimed in the appended claims.

What is claimed is:
1. A computer system for detecting and configuring an external input/output (IO) enclosure, comprising:
   a processor;
   a PCI host bridge (PHB); said PHB connected to said processor and a plurality of PCIE add-in card slots connected to the PHB; one or more cables connecting between the PHB and the external enclosure, each cable including high and low cable; system firmware including detecting and configuring functions;
   said processor using said system firmware and sideband structure for detecting a PCIE cable card and configuring the external input/output (IO) enclosure; said processor using said system firmware and sideband structure
   responsive to detecting said PCIE cable card, determine a type cable card;
   read predefined registers and determine if cables are connected to said PCIE cable card;
   determine if cables are connected to an IO drawer by verifying sideband signals are trained and communication is successful;
   read modules Vital Product Data (VPD) through each of the high and low cables to identify matching serial numbers;
   determine an identity of an IO drawer to which each cable of the cables is connected and verify the connection of each cable of the cables is correct;

determine if the one or more cables form an operable PCIE link; and responsive to detecting a degraded signal, performing a health check of the operable PCIE link.

2. The system as recited in claim 1, includes control code stored on a computer readable medium, wherein said control code comprising said system firmware.

3. The system as recited in claim 1, includes said processor using said system firmware and sideband structure and said predefined registers including optical transceivers (CXPs) on both ends of an active optical cable (AOC for detecting cables being connected to the PCIE cable card and connected to an IO drawer.

4. The system as recited in claim 3, includes said processor using said system firmware and sideband structure to identify one or more of a plurality of cables connected to different IO drawers.

5. The system as recited in claim 3, includes said processor using said system firmware and sideband structure to report to system management functions and customer user interfaces when cables are incorrectly connected to different IO drawers.

6. The system as recited in claim 3, includes said processor using said system firmware and sideband structure to determine each cable is properly connected to convey PCIE lanes from the PHB passing through the cable card and cable to the corresponding PCIE lanes of the PCIE slot.

7. The system as recited in claim 3, includes said processor using said system firmware and sideband structure to determine when one or more cables within a plurality of cables comprising a single PCIE link is inoperable or disconnected from the cable card or IO drawer, and to determine when other connected cables are able to form an operable PCIE link.

8. The system as recited in claim 3, includes said processor using said system firmware and sideband structure to determine when one or more cables within a plurality of cables comprising a single PCIE link is inoperable or disconnected from the cable card or IO drawer, and to determine when other connected cables are unable to form an operable PCIE link.

9. The system as recited in claim 3, includes said processor using said system firmware and sideband structure to report to system management functions and customer user interfaces when cables are inoperable or disconnected from the cable card or IO drawer.

* * * * *